(12) United States Patent
Wirz et al.

(10) Patent No.: US 10,935,327 B2
(45) Date of Patent: Mar. 2, 2021

(54) THERMAL ENERGY STORAGE SYSTEM

(71) Applicant: The Regents of the University of California, Oakland, CA (US)

(72) Inventors: Richard E. Wirz, Los Angeles, CA (US); Amey Barde, Oakland, CA (US); Karthik Nithyanandam, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 72 days.

(21) Appl. No.: 16/083,458

(22) PCT Filed: Feb. 28, 2017

(86) PCT No.: PCT/US2017/019947
§ 371 (c)(1),
(2) Date: Sep. 7, 2018

(87) PCT Pub. No.: WO2017/151612
PCT Pub. Date: Sep. 8, 2017

(65) Prior Publication Data
US 2019/0072339 A1 Mar. 7, 2019

Related U.S. Application Data

(60) Provisional application No. 62/301,602, filed on Feb. 29, 2016, provisional application No. 62/301,618, filed on Feb. 29, 2016.

(51) Int. Cl.
*F28D 20/02* (2006.01)
*F28D 20/00* (2006.01)
(Continued)

(52) U.S. Cl.
CPC ......... *F28D 20/021* (2013.01); *F24H 7/0208* (2013.01); *F24H 7/0216* (2013.01);
(Continued)

(58) Field of Classification Search
CPC ............ F28D 20/0034; F28D 2020/00; F28D 2020/0004; F28D 2020/0013;
(Continued)

(56) References Cited

U.S. PATENT DOCUMENTS

| 3,400,249 | A | * | 9/1968 | Mekjean | ............. F28D 20/0034 392/341 |
| 3,596,034 | A | * | 7/1971 | Mekjean | ............... F24H 7/0433 219/628 |

(Continued)

OTHER PUBLICATIONS

International Search Report and Written Opinion, dated Jun. 28, 2017, in corresponding International Application No. PCT/US2017/019947, filed Feb. 28, 2017 (9 pages).

*Primary Examiner* — Jianying C Atkisson
*Assistant Examiner* — Jose O Class-Quinones
(74) *Attorney, Agent, or Firm* — Christensen O'Connor Johnson Kindness, PLLC

(57) ABSTRACT

A thermal energy storage (TES) component includes a shell having first and second ports, and at least a first set of thermally conductive sealed containers that contain a TES media for storing thermal energy. A first set of sealed tubes containing a first TES media are in a first section of the shell, and a second set of sealed tubes containing a different TES media are in a second section of the shell. Electric heating elements are immersed in at least some of the tubes, and may extend only from one end of the tube. In some embodiments more than one heating element is immersed in the TES media and positioned to enhance convective flow. In some embodiments electric heating elements are disposed externally on the sealed tubes. Some tubes are tapered or frustoconical, with heating elements provided in a larger-diameter portion of the tubes.

17 Claims, 8 Drawing Sheets

(51) Int. Cl.
*F24H 7/02* (2006.01)
*F24H 9/00* (2006.01)

(52) U.S. Cl.
CPC ......... *F24H 7/0233* (2013.01); *F24H 9/0021* (2013.01); *F28D 20/0034* (2013.01); *F24D 2220/10* (2013.01); *F24H 2250/02* (2013.01); *Y02E 60/14* (2013.01)

(58) Field of Classification Search
CPC ..... F28D 2020/0026; F28D 2020/0069; F28D 2020/0078; F28D 2020/0082; F28D 2020/0086; F28D 20/021; F28D 20/026; F24H 7/0208; F24H 7/0233; F24H 7/0216; F24H 7/0241; F24H 7/0443; F24H 7/0441; F24H 7/0225; F24H 7/0408; F24H 7/0416; F24H 7/0425; Y02E 60/142; Y02E 60/145
See application file for complete search history.

(56) References Cited

U.S. PATENT DOCUMENTS

| | | | | |
|---|---|---|---|---|
| 4,104,185 A * | 8/1978 | Schroder | ............... | C09K 5/063 252/70 |
| 4,119,143 A * | 10/1978 | Robinson, Jr. | ........ | F24D 11/003 126/400 |
| 4,127,161 A * | 11/1978 | Clyne | ................ | F28D 20/02 126/400 |
| 4,164,253 A * | 8/1979 | Skala | ................ | F24H 7/0433 126/400 |
| 4,165,569 A * | 8/1979 | MacKay | ............... | C01B 3/0005 34/416 |
| 4,924,935 A | 5/1990 | Van Winckel | | |
| 4,993,481 A * | 2/1991 | Kamimoto | ........... | C04B 38/0006 126/643 |
| 5,054,540 A * | 10/1991 | Carr | .................... | B60H 1/3201 165/10 |
| 5,165,466 A * | 11/1992 | Arbabian | ............... | F24D 11/00 165/10 |
| 5,736,059 A * | 4/1998 | MacKelvie | ........... | F24D 17/001 210/774 |
| 6,400,896 B1 * | 6/2002 | Longardner | ........... | F28D 20/02 126/400 |
| 6,499,534 B1 * | 12/2002 | Tawney | ................ | F28D 7/024 165/156 |
| 6,561,266 B1 * | 5/2003 | Ehrlicher | ............. | B01F 5/0659 165/161 |
| 7,225,860 B2 * | 6/2007 | Baginski | ................. | F28D 7/16 126/400 |
| 2002/0002837 A1 * | 1/2002 | Shirota | ................. | B60H 1/005 62/430 |
| 2011/0146939 A1 * | 6/2011 | Bond | ..................... | F25B 30/04 165/10 |
| 2011/0189619 A1 * | 8/2011 | Lloyd | ............... | F28D 20/0056 432/1 |
| 2013/0087316 A1 * | 4/2013 | Goenka | ............. | B60H 1/00328 165/173 |
| 2014/0110080 A1 | 4/2014 | Bergan | | |
| 2015/0060008 A1 | 3/2015 | Wirz et al. | | |
| 2015/0114590 A1 * | 4/2015 | Brunhuber | ......... | F28D 20/0056 165/10 |
| 2015/0224850 A1 * | 8/2015 | Bank | ................ | B60H 1/00492 392/340 |
| 2015/0241136 A1 * | 8/2015 | Maeda | ................... | F28D 20/02 165/10 |

\* cited by examiner

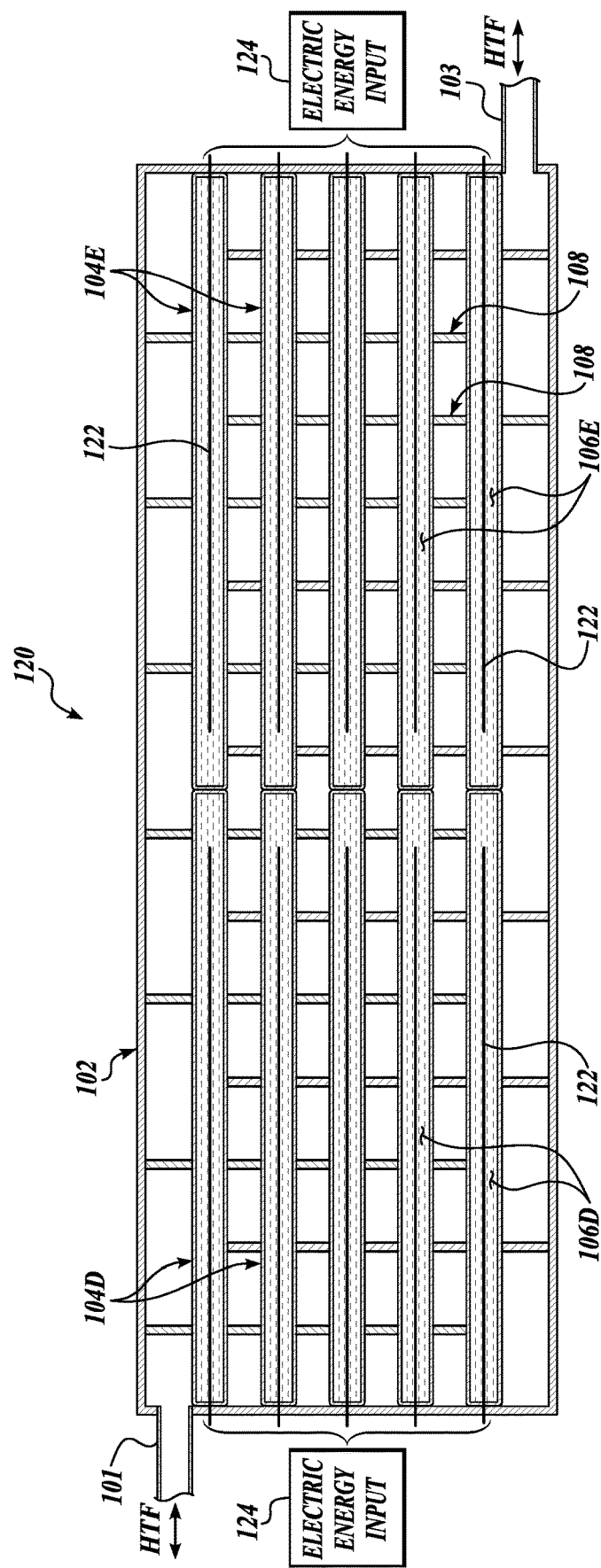

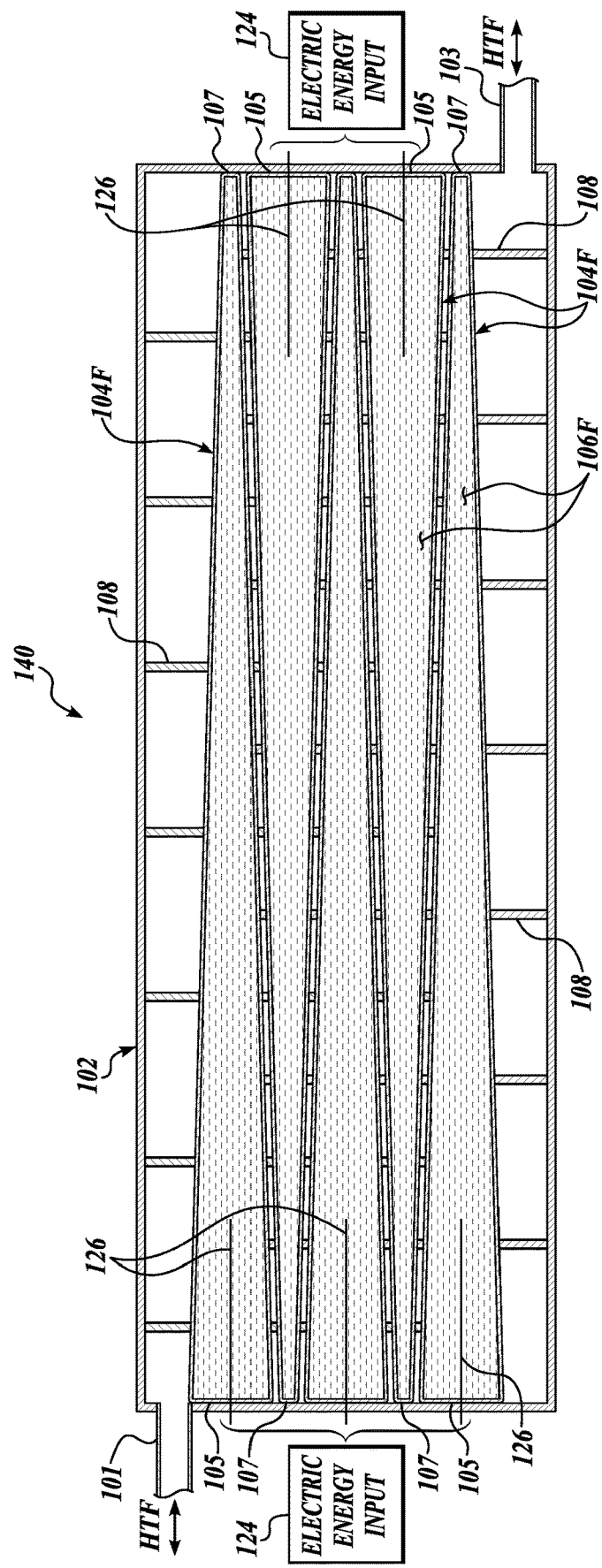

THERMAL ENERGY STORAGE SYSTEM

CROSS-REFERENCES TO RELATED APPLICATIONS

This application claims the benefit of U.S. Application No. 62/301,602, filed Feb. 29, 2016, and U.S. Application No. 62/301,618, filed Feb. 29, 2016, entire disclosures of said applications are hereby incorporated by reference herein.

STATEMENT OF GOVERNMENT LICENSE RIGHTS

This invention was made with Government support under Grant No. DE-AR0000140 awarded by DOE ARPA-E. The Government has certain rights in the invention.

BACKGROUND

Renewable energy sources, such as solar, wind, etc., are an important component of the technology mix for a global sustainable infrastructure and reduce greenhouse gas emissions. However, many renewable energy sources are inherently intermittent, which presents a great challenge in energy generation and load balance maintenance to ensure power network stability and reliability. Incorporating low cost, high performance energy storage provides significant benefits such as operational flexibility, load leveling, etc. Thermal energy storage (TES) is an effective low-cost tool to bridge the gap between energy demand and supply due to inherent limitations of the energy sources, including renewable energy and fossil fuels, and is a critical component of energy systems including power plants, space heating/cooling applications, and industrial heating processes.

TES systems may be used as an efficiency component in power systems, for example to store excess energy when energy production exceeds demand, and to release the stored excess energy when energy demand exceeds the production capacity. Such systems are particularly beneficial for power systems that incorporate significant renewable energy production, when the availability of the renewable energy is irregular or periodic. In addition to avoiding energy shortages, TES systems may improve efficiency and costs for the energy provider by allowing the provider to reduce or eliminate the need to purchase or generate high-cost energy during peak demand periods, and/or by reducing the capital costs associated with increasing power production capacity.

Prime movers or generators operate (e.g., modern high-temperature Rankine power blocks) at maximum efficiency at known set point temperatures and heat rates. Deviation from design heat rates and temperatures may result in drastic drop-offs in electricity generation efficiency. In industrial power applications heat requirements may dictate the efficacy of the main facility that a combined heat and power (CHP) plant or other heat source is attached to. An exemplary power production and TES system using thermal energy storage is disclosed in published International Publication Number WO 2016/210433, to Lavine et al, which is hereby incorporated by reference in its entirety.

In U.S. Patent Application Publication No. 2015/0060008, to Wirz et al., which is hereby incorporated by reference in its entirety, a thermal energy storage (TES) system is disclosed having a plurality of elongated containers that enclose a thermal storage media, for example, elemental sulfur. The containers are disposed in an outer shell such that a heat transfer fluid (HTF) flowing through the shell will exchange thermal energy with a thermal energy storage (TES) media. For example, during charging cycles a hotter HTF flowing through the shell will heat the TES media (through the container walls), to store the thermal energy therein. During a discharging cycle, when the stored thermal energy is needed for other purposes, a cooler HTF flowing through the shell will extract heat from the TES media, typically transporting the energy to an energy consumer. For example, stored thermal energy may be transported to a power block.

A typical Rankine power block, will require or operate most efficiently with energy provided in a fluid stream having a specified flow rate and a specified temperature. A conventional TES system may not be able to provide uniform flow and temperature characteristics for such a system. As energy is extracted from a conventional TES system and the stored energy is gradually depleted, the HTF temperature or flow rate (or both) will decline. The heat transfer from the TES media to the HTF passing through the TES system depends on the flow rate of the HTF. A slower flow rate allows more time for energy transfer, and a faster flow rate allows more time for energy transfer. Thus, the HTF flow rate affects the outlet temperature. The HTF flow rate and the temperature cannot be independently specified. Solutions to this dilemma are exergetically inefficient, resulting in a reduction in the amount of useful energy that can be extracted from the TES system.

U.S. Patent Application Publication No. 2013/0105106, to Goswami et al., which is hereby incorporated by reference in its entirety, discloses a thermal energy storage system that includes cascades with phase change material for the TES media. However, phase change materials may not have heat transfer rates that are desirable for commercial TES systems.

U.S. Patent Application Publication No. 2013/0056170, to Klemencic, which is hereby incorporated by reference in its entirety, discloses a system that uses cascading multistage thermal energy storage. Other ideas for thermal energy storage address the advantages of cascading with multi-node access. A clear challenge of all of these technologies is the inflexibility to achieve desired/optimal system performance during operation, which is enabled by the current invention. For example, modular thermal energy storage systems that focus upon phase change material storage are disclosed in U.S. Pat. No. 5,165,466, to Arbabian, and in U.S. Pat. No. 4,524,756, to Laverman, which are hereby incorporated by reference in their entirety, which build on the existing body of work on cascaded systems.

SUMMARY

This summary is provided to introduce a selection of concepts in a simplified form that are further described below. This summary is not intended to identify key features of the claimed subject matter, nor is it intended to be used as an aid in determining the scope of the claimed subject matter.

A thermal energy storage component includes a shell with first and second ports. A first set of spaced-apart conductive sealed containers filled with a first TES media are disposed in a first section of the shell, and a second set of sealed containers filled with a second TES media are in a second section of the shell. A flow path through the shell extends from the first port, through section containing the sealed containers with the first TES media, then through the containers with the second TES media, then through the second port. One or more baffles define a flow serpentine path through the shell. Sealed tubes containing TES media (for example, containing different TES media) in a single shell allows different sections in the TES component to be optimized for different temperatures within the tank.

In an embodiment the sealed containers are cylindrical or tapered tubes.

In an embodiment the first sealed containers are aligned with the second sealed containers.

In an embodiment a third set of sealed containers containing a different TES media are disposed between the first and second sealed tubes.

In an embodiment electric heating elements are provide in at least one of the sets of tubes, and are immersed in the TES media, such that the TES media can be thermalized using an external electric power source, for example when excess electric production capacity is available.

In an embodiment the sealed containers are oriented horizontally, and the electric heating elements are disposed in a lower half of the container, to enhance convection in the container. In an embodiment at least two heating elements are immersed in at least some of the containers in the TES media, and disposed on opposite lower quadrants of the container, which has been found to improve convective heat transfer.

In some embodiments external electric heating elements are provided on an outer surface of at least some of the containers filled with a TES media. The external heating elements may be operated to heat the heat transfer fluid direction, and/or to heat the TES media. In some embodiments the external heating elements are inductive heating elements.

In another embodiment the sealed containers are sealed frustoconical tubes, which may include heating elements immersed in the TES media in a portion of the tubes nearest the large end.

In an embodiment, a cylindrical baffle is disposed in the shell. The first section of the shell is an annular portion of the enclosed volume radially outward from the cylindrical baffle and the second section is a cylindrical portion of the enclosed volume radially inward from the cylindrical baffle. The first port provides a flow path into the annular first section, and the second port defines a flow path into the cylindrical second section.

A thermal energy storage (TES) component includes a shell defining an enclosed volume, and having a first port into the volume and a second port into the volume. A set of spaced-apart thermally conductive sealed tubes disposed in the enclosed volume, the first set of sealed containers enclosing a TES media. A plurality of electrical heating elements, each heating element associated with one of the sealed tubes and immersed in the TES media enclosed in the associated sealed tube. A baffle is disposed in the shell between the first port and the second port. A flow path for a heat transfer fluid extends through the first port into the enclosed volume in spaces between the sealed containers, around the at least one baffle, and through the second port.

In an embodiment the set of sealed tubes are tapered tubes having a large end and a small end, and the heating element extends from the large end part way towards the small end.

In an embodiment the tapered sealed tubes are oriented in opposite directions within the shell, such that a large end of each sealed tube is near to a small end of at least one neighboring sealed tube.

In an embodiment the sealed tubes are frustoconical and arranged in a parallel array. In an embodiment a second plurality of electrical heating elements are disposed on an external surface of an associated sealed tube.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 illustrates another embodiment of a TES component in accordance with the present invention, having two longitudinally spaced sets of sealed containers, and further comprising resistive heating elements that extend into the containers;

FIG. 4 illustrates another embodiment of a TES component in accordance with the present invention, having a plurality of frustoconical or tapered sealed containers containing TES media, and resistive heating elements extending into the wide end of the sealed containers;

DETAILED DESCRIPTION

Figure 1:
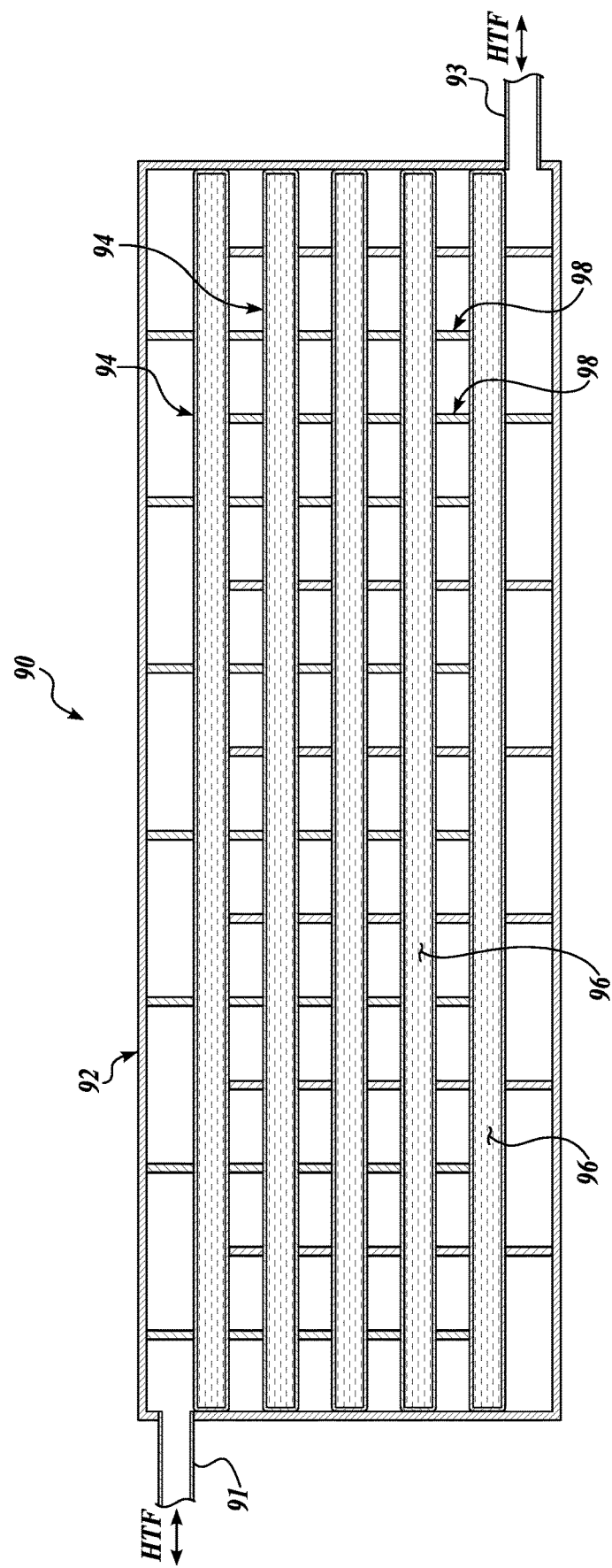
FIG. 1 illustrates a prior art thermal energy storage (TES) component having a plurality of sealed tubes disposed in a shell, each of the sealed tube containing a TES media.

A prior art thermal energy storage (TES) component 90 is illustrated in cross section in FIG. 1. The TES component 90 includes a shell 92 enclosing a plurality of thermally conductive sealed containers 94. The sealed containers 94 contain a TES media 96, as are known in the art. The TES media 96 may store thermal energy storage as sensible heat, latent heat, and/or by chemical means. See, for example, U.S. Pat. No. 9,038,709, to Bank et al., which is hereby incorporated by reference. TES media are typically selected based at least in part on a design temperature range for a particular TES application. However, a TES system may require operation over a broader temperature range than is optimal for a particular TES media. In TES systems operating over a broad temperature range, the TES media may be optimal only for a relatively narrow portion of the temperature range.

In the TES component 90 in FIG. 1, the HTF enters the shell 92 through a first port 91, flowing in contact with the sealed containers 94 in the shell 92, and exits the shell 92 through a second port 93. Baffles 98 define a serpentine flow path within the shell 92 between a first port 91 and a second port 93. In some embodiments the HTF flows from the first port 91 to the second port 93 when charging the TES media 96, and in the opposite direction, from the second port 93 to the first port 91 when extracting energy from the TES media 96. The HTF preferably has a desirable combination of properties, for example, suitable transition temperatures for the application, high thermal conductivity, low viscosity, high heat capacity, chemical stability and compatibility with other system components, low cost, high availability, and benign environmental properties (e.g., low toxicity and low volatility). Exemplary HTFs include gases such as air, steam, helium, and carbon dioxide, fluids such as water, synthetic oils, molten salts, liquid metals such as sodium and sodium alloys, and lead bismuth eutectic compositions. Nanofluids (fluids containing nanoparticles) provide advantages over conventional HTFs. See, for example, U.S. Pat. No. 7,871,533, to Haiping et al., which is hereby incorporated by reference. The sealed containers 94 are arranged in an array providing a flow path for the HTF along and between the sealed containers 94. In exemplary embodiments the shell 92 may be polygonal in cross-section, for example rectangular, hexagonal, octagonal, or the like. In other embodiments the shell 92 may be circular or oval in cross-section.

During a "charge cycle" relatively high-temperature HTF enters the shell 92 and heats the TES media 96 (and the containers 94). For example, an HTF may be heated by a concentrating solar thermal source, a geothermal source, a waste heat stream, or the like. In a "discharge cycle" relatively low-temperature HTF enters the shell 92 and the HTF is heated by the TES media 96. The heated HTF then typically transports the thermal energy to a user, for example a heat engine such as a power block, for generating electricity. Optionally, the sealed containers 94 may be provided with features to facilitate heat transfer between the HTF and the TES media 96 enclosed in the sealed containers 94, as are known in the art. For example inner and/or outer fins, or other surface-increasing features on the container inner and/or outer wall surfaces, may facilitate the desired heat transfer.

Thermal energy storage components are disclosed herein that improve on prior art TES components 90. For example, TES components may define regions within the shell that are optimized for different temperatures. The TES components may include a plurality of different and segregated TES media selected to optimize storing thermal energy within the shell, to accommodate corresponding temperature regimes within the tank.

The TES components may additionally or alternatively include a plurality of modes for heating the TES media within sealed containers. The different regimes and heating modes are arranged in combinations to achieve a desired heat transfer and exergetic performance. A plurality of different energy sources to heat TES media sealed within TES containers provide opportunities for improving the efficiency of TES components and to take advantage of multiple resources.

The energy from these sources can be stored either synchronously or asynchronously depending on availability and needs, and can be dispatched for a wide variety of thermal demands, including heating, thermoelectric generation needs, fuel production, mechanical process, chemical process, thermochemical process, and others. In some embodiments an exergetic efficiency and heat transfer performance is achieved by incorporating a plurality of electric heaters or resistive and/or inductive wires located strategically inside or around the sealed containers, to provide a hybrid energy storage system (HESS) configured to heat a TES media both with one or more thermal energy sources (using the HTF to transport the energy to the TES media) and non-thermal sources (for example resistive heaters immersed in the TES media, and/or surrounding sealed containers containing the TES media).

The containers are thermally conductive to accommodate the design heat transfer requirements, structurally robust to accommodate design pressures within the system, and compatible with the material contained therein, as well as the heat transfer fluids transporting thermal energy to and from the TES component. For example, the containers may be formed of stainless steel, iron, carbon steel, carbon, aluminum, nickel, tantalum, molybdenum, platinum, or combinations thereof.

The HESS system is particularly applicable to large-scale TES systems that can be integrated with fuel, gas, and electric energy sources to provide responsiveness to a wide range of energy source fluctuations and availability. For example, short term energy storage devices that are dedicated for power quality and distributed generation applications, e.g., supercapacitors, batteries, superconducting magnets, or the like, can be integrated either in series or parallel to provide rapid responsiveness of the power plant to sources and end users, and thus have a buffering capacity to smooth electricity production.

Figure 2:
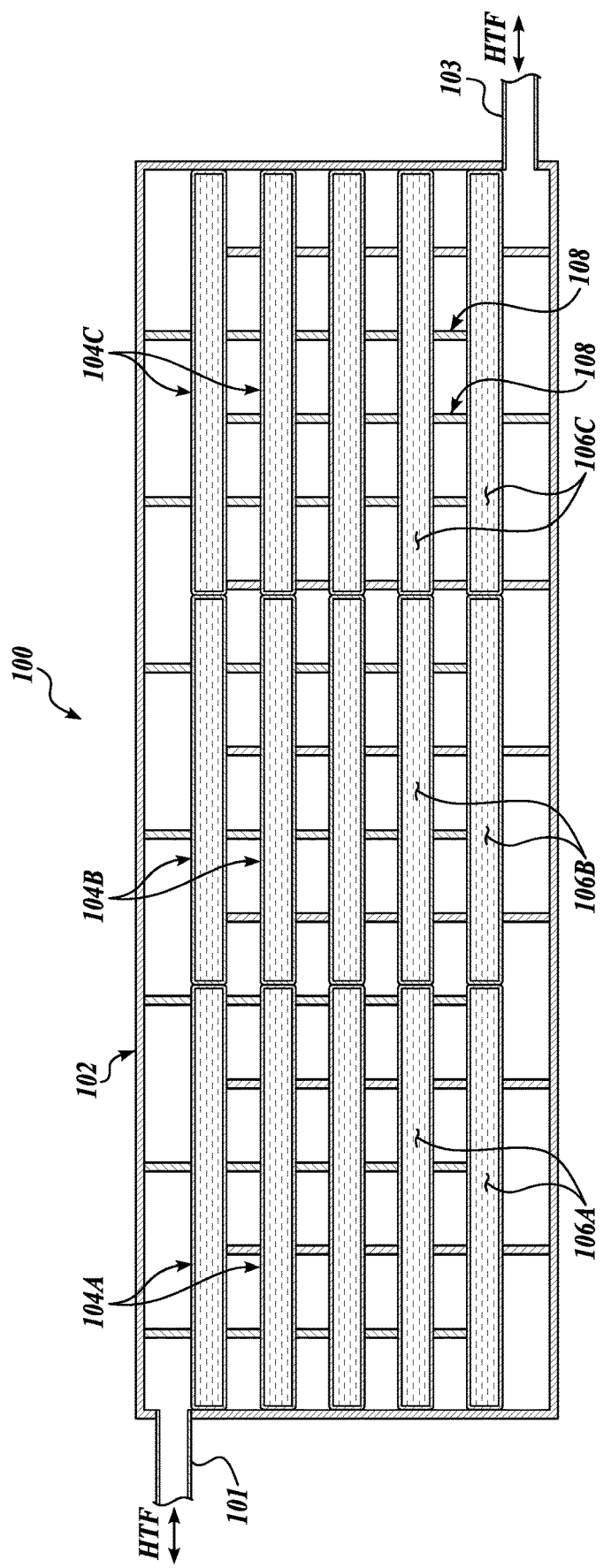
FIG. 2 illustrates a TES component in accordance with the present invention and having three sets of sealed containers containing TES media, wherein each set of containers occupies a longitudinal segment within a single shell.

FIG. 2 illustrates in cross section a TES component 100 in accordance with the present invention. The TES component 100 includes an outer shell 102 enclosing a plurality of longitudinally separate sets of sealed containers 104A, 104B, 104C. Each set of sealed containers 104A, 104B, 104C contains a corresponding TES media 106A, 106B, 106C. A first port 101, a second port 103, and a system of baffles 108 define a serpentine flow path through the shell 102 for transferring thermal energy between the HTF and the TES media, similar to the TES component shown in FIG. 1, and described above.

In this embodiment the first set of sealed containers 104A are located in a section of the shell 102 that is nearest the first port 101, the second set of sealed containers 104B are located centrally in the shell 102, and the third set of sealed containers 104C are located in a section of the shell 102 nearest the second port 103. More or fewer sections may be used to accommodate a particular application.

In this embodiment the TES media 106A sealed in the first set of containers 104A is different from the TES media 106B sealed in the second set of containers 104B, and both are different from the TES media 106C sealed in the third set of containers 104C. The TES media 106A, 106B, 106C are optimized for energy storage in a particular temperature range. For example, one or more of the TES media 106A, 106B, 106C may comprise liquid-vapor phase change materials, and the phase transition temperatures may be different for the different TES media. As another example, a TES media that will encounter highest temperatures during operations may comprise an elemental material to provide greater stability over time. Exemplary elemental materials for a TES media include sulfur, mercury, or selenium. Other classes of TES media include oils and molten salts.

For example, during a charge cycle heated HTF enters the shell 102 through the first port 101. During a charge cycle the entering HTF typically is at a peak temperature upon entering the shell 102, and begins to cool as heat is transferred to the TES media 106A in the first set of containers 104A. The TES media 106A may therefore be selected for optimal performance with this peak initial temperature range. The HTF continues through the TES component 100 and cools to an intermediate temperature range before encountering the second set of sealed containers 104B. The TES media 106B is preferably selected for optimal performance with this intermediate temperature range. The HTF continues to cool as heat is transferred to the TES media 106B. The cooler HTF then encounters the third set of sealed containers 104C prior to exiting through the second port 103. The TES media 106C may be selected for optimal performance with this lower temperature range.

In this embodiment during the discharge cycle when the HTF is heated by the TES component 100, the HTF flows in the opposite direction. The relatively cool HTF enters the second port 103 and initially encounter the lower-temperature sealed containers 104C, then the intermediate temperature range containers 104B, then finally the high temperature containers 104A. The gradual or step-wise increasing temperatures will decrease the temperature difference between the TES media and the HTF, improving the exergetic performance of the TES component 100.

Although the sets of sealed containers 104A, 104B, 104C are shown in an abutting arrangement, in some embodiments they may be spaced apart longitudinally and/or offset transversely. For example, in some embodiments the sets of sealed containers 104A, 104B, 104C are not aligned, and overlap in the longitudinal direction, providing a transition region between the sets of containers.

FIG. 3 illustrates in cross section a TES component 120 in accordance with the present invention. In this embodiment two sets of sealed containers 104D, 104E are disposed in different sections of the shell 102, with members of one set of sealed containers 104D generally aligned with corresponding members of the other set of sealed containers 104E. The sealed containers 104D contain a first TES media 106D, and the sealed containers 104E contain a second TES media 106E, preferably different from the first TES media 106D. As in the previous embodiments, the first and second ports 101, 103 respectively provide an entry and exit for the HTF, and baffles 108 define a flow path between the ports 101, 103. More sets of sealed containers are contemplated.

In this embodiment the sealed containers 104D, 104E further include one or more electrically powered heating elements 122 that are immersed in the TES media 106D, 106E, with an end or terminal of the heating elements 122 extending out from the corresponding container. The heating elements 122 may be, for example, resistive (or Joule) heating elements 122. Other embodiments may use electric arc heating, induction heating, and/or dielectric or high-frequency heating. Although the heating elements 122 shown extend along most of the length of the associated sealed containers 104D, 104E, it is contemplated that in some embodiments they may only extend a relatively short distance from the associated port 101, 103, as discussed below.

One or more electric energy sources 124 are connected to the heating elements 122, and provide an alternative or additional means for heating the TES media 106D, 106E. For example, in some applications the heating elements 122 are energized when excess electric energy production is available in order to efficiently store the excess energy in the associated TES media 106D, 106E. For example, in one application the TES component 120 may be used for load leveling, wherein during low demand periods excess energy production capacity is stored as thermal energy in the TES component 120, and later extracted to meet peak demand requirements.

In other applications the heating elements 122 may be used to provide supplemental energy to the TES media to ensure that the HTF exiting the TES component 120 achieves a desired output temperature during a discharge cycle. Electrically heating the TES media 106D, 106E may improve the efficiency of a larger energy production facility. It may be advantageous to electrically heat the TES media, for example using energy from the local power grid, in order to maintain a desired temperature and outflow of the HTF to enable efficient operation of a power block, for example, a supercritical steam Rankine cycle power block (not shown). In some embodiments the heating elements 122 are only provided near the HTF input port 101 because the energy input to the HTF can be added more quickly to the relatively cool HTF, enabling the TES component 120 to respond more quickly if the depletion of the thermal energy stored in the TES media 106D, 106E approaches levels that would prevent the HTF from achieving the desired temperature.

FIG. 4 illustrates in cross section another TES component 140 in accordance with another aspect of the present invention. In this embodiment a plurality of tapered or frustoconical sealed containers 104F are disposed in the shell 102. The tapered sealed containers 104F containing a TES media 106F. The tapered containers 104F each have a large end 105 and an oppositely disposed narrow end 107. The tapered containers 104F are alternatingly arranged, with some of the tapered containers 104F disposed with the large end 105 adjacent or near the left end of the shell 102, and the remaining tapered containers oriented with the large end 105 adjacent or near the right end of the shell 102. In this embodiment relatively short heating elements 126 are immersed in the associated TES media 106F, with an end of the heating element 126 configured to receive electrical energy from an external electric energy source 124.

The portion of the tapered containers 104F near the large end 105 contains a larger portion of enclosed TES media, and therefore the thermal resistance to transfer heat to or from the HTF will be increased. The immersed heating elements 126 positioned in the portion of the container 104F near the larger end 105 improves the performance of the TES component 140 by preferentially adding energy to the portion of the TES media 106F farthest from the HTF. This embodiment provides an effective means for increasing the total volume of TES media in the TES component 140, while also allowing effective heat transfer to and from the TES media.

It is contemplated that the tapered or frustoconical containers 104F may be formed in two or more separate longitudinal segments positioned in alignment, similar to the embodiments shown in FIGS. 2 and 3.

Figure 5A:
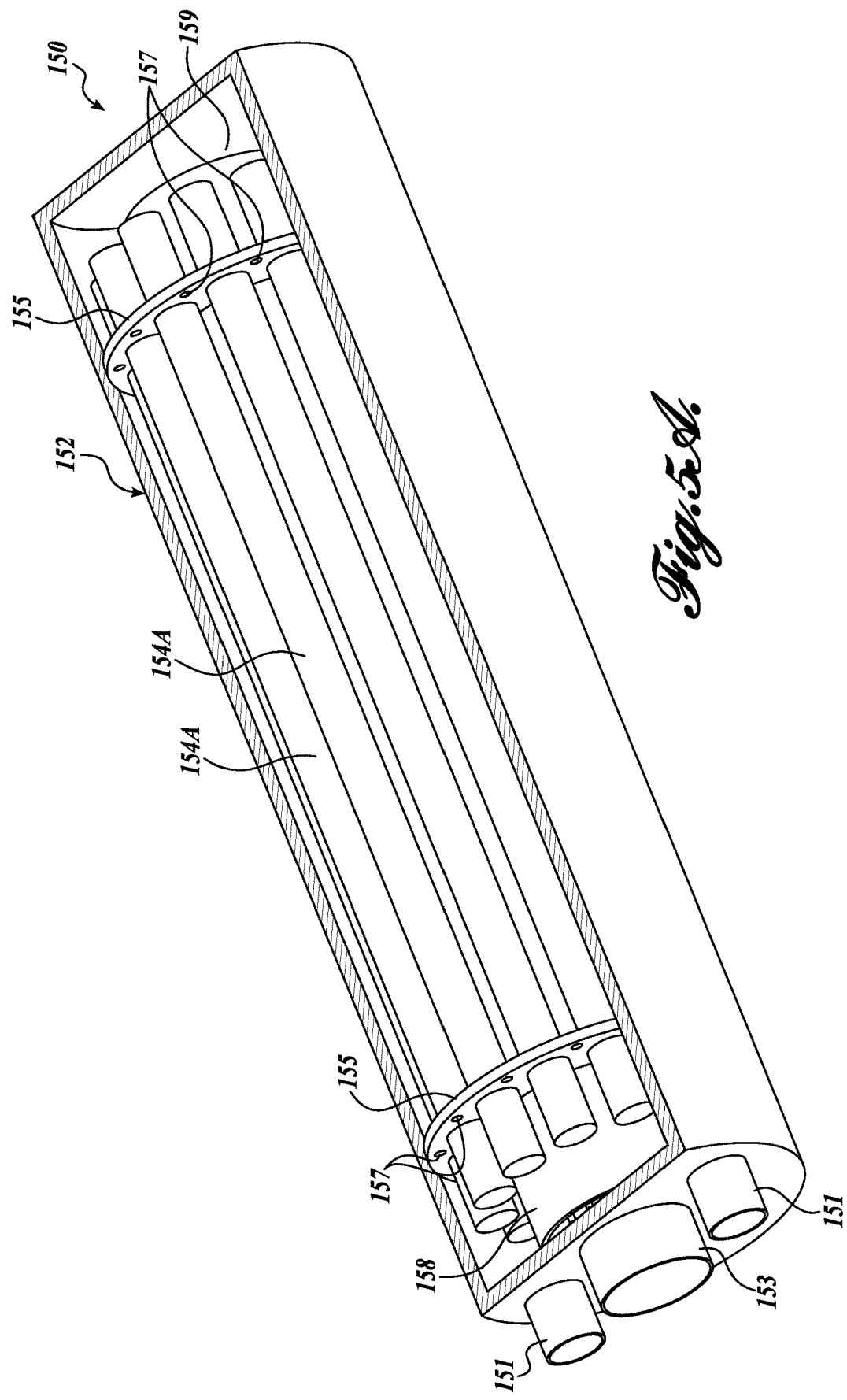
FIG. 5A is break away view of another embodiment of a TES component in accordance with the present invention having a cylindrical shell.
Figure 5B:
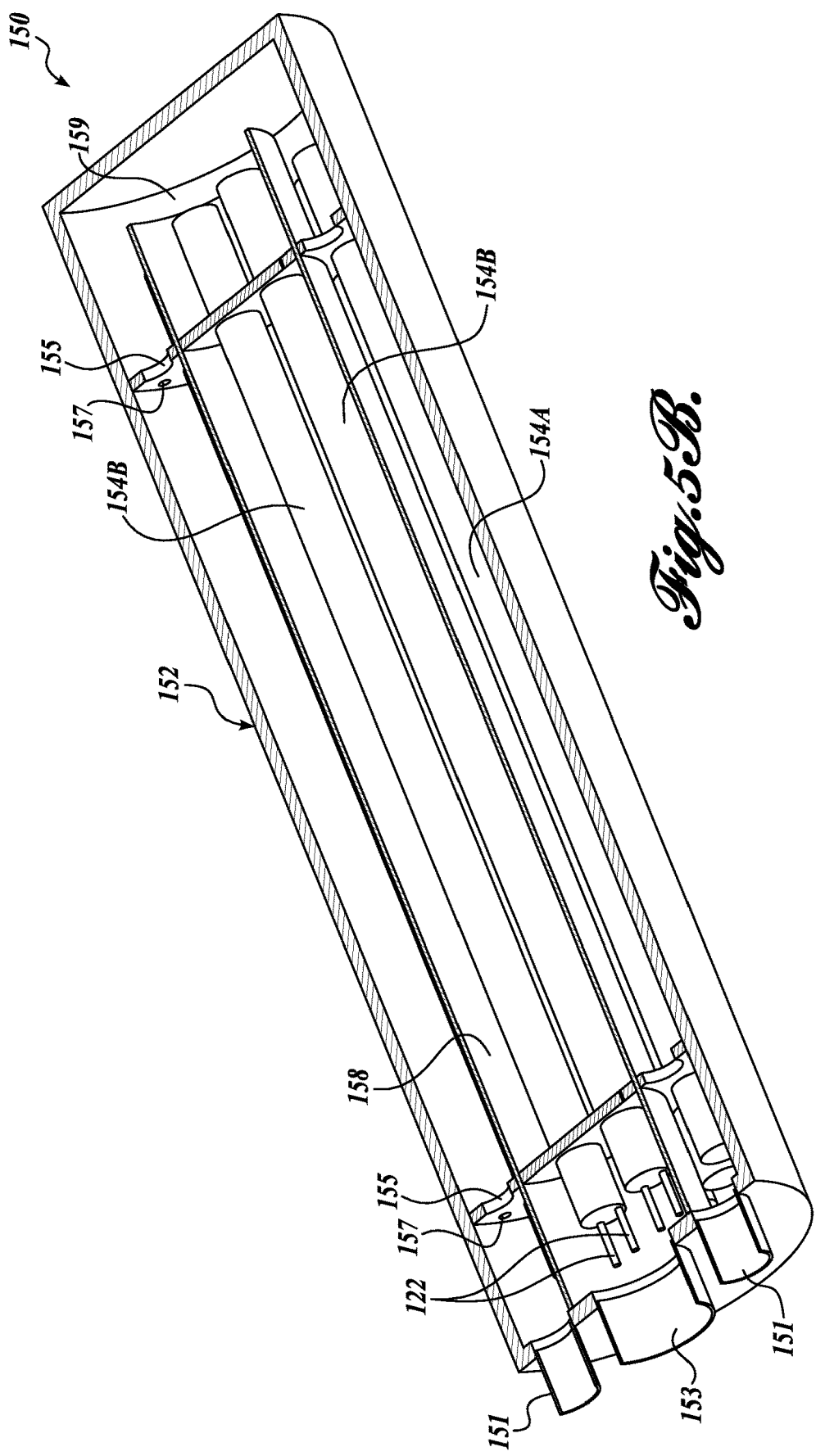
FIG. 5B is a sectional view of the TES component shown in FIG. 5A.

FIG. 5A is a perspective break away view showing another embodiment of a TES component 150 in accordance with the present invention, with a portion of the shell 152 removed to show internal features of the TES component 150. FIG. 5B shows a sectional view of the TES component 150, which shows additional internal features. In this embodiment, the shell 152 is generally cylindrical and encloses a plurality of sealed containers 154A, 154B that contain respective TES media. The first set of sealed containers 154A containing a first TES media are disposed in a radially outer section of the shell 152, and a second set of sealed containers 154B containing a second TES media are disposed in a radially inner section of the shell 152.

The shell 152 includes two peripheral first ports 151 and a central second port 153. The first and second ports 151, 153 provide a passageway for the HTF to flow into and out of the shell 152. Two support plates 155, each having a plurality through channels 157, support the sealed containers 154A, 154B in a predetermined position in the shell 152. A cylindrical baffle 158 extends from the port end of the shell 152, along most of the length of the shell 152, and defines a gap 159 between the end of the shell 152 and the baffle 158.

It will now be appreciated that an HTF entering the first ports 151 will flow in the axial direction in contact with the first set of sealed containers 154A disposed radially outward from the baffle 158, then through the gap 159, and back and in contact with the second set of sealed containers 154B, towards the second port 153. In this embodiment the sets of sealed containers 154A, 154B are disposed in radially differing sections of the shell 152. It is contemplated that more than two radial sections in the shell may be provided, for example, to incorporate more sets of sealed containers optimized for different temperatures with the addition of additional baffles.

It will be appreciated that the second set of sealed containers 154B are disposed radially inward from the first set of sealed containers 154A, which provides thermal advantages by reducing thermal losses from the inner containers 154B. In addition, in this embodiment the second set of sealed containers 154B have electric heating elements that extend into the sealed containers, providing a second mode for heating the TES media contained in the containers 154B.

Figure 6:
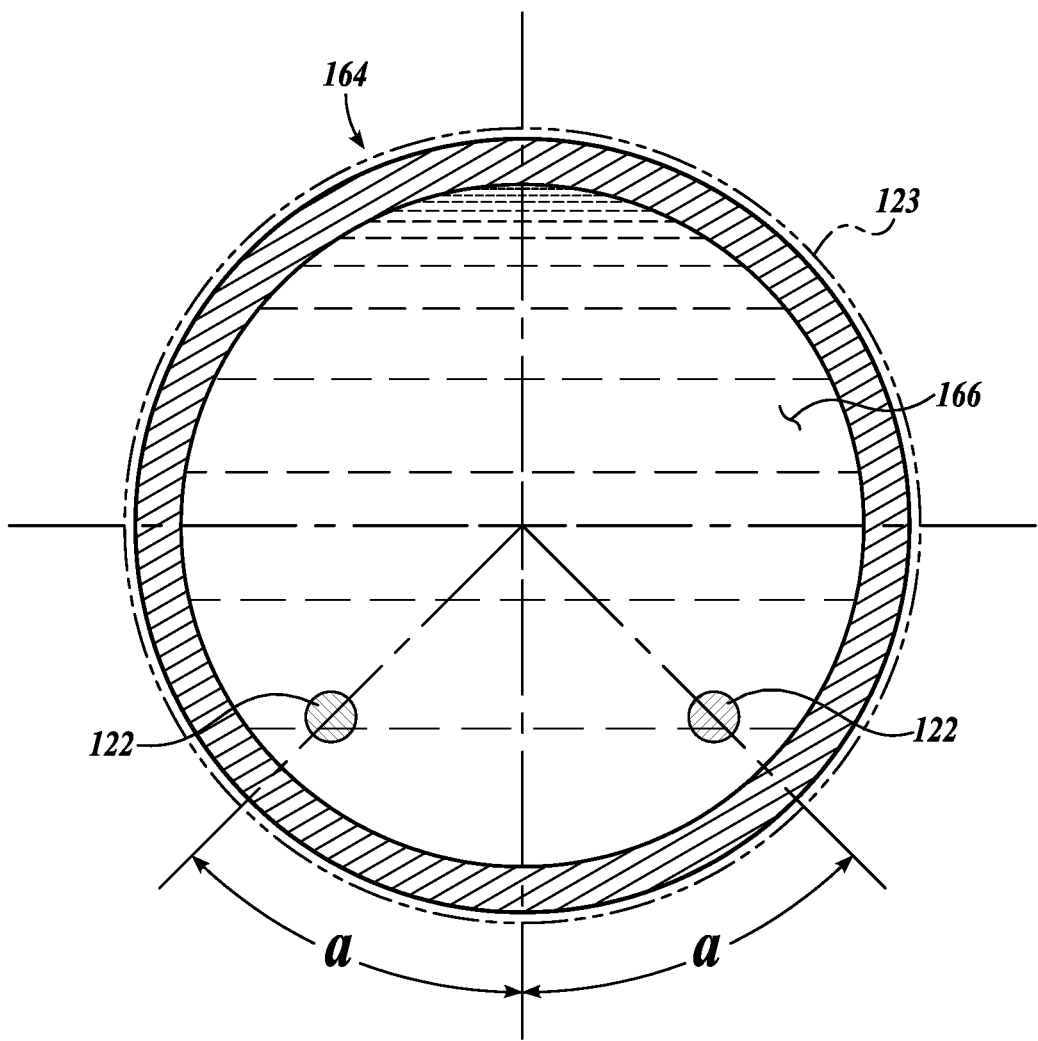
FIG. 6 is a detail view showing a currently preferred placement of heating elements in and on a tubular sealed container containing a TES media.
Figure 7A:
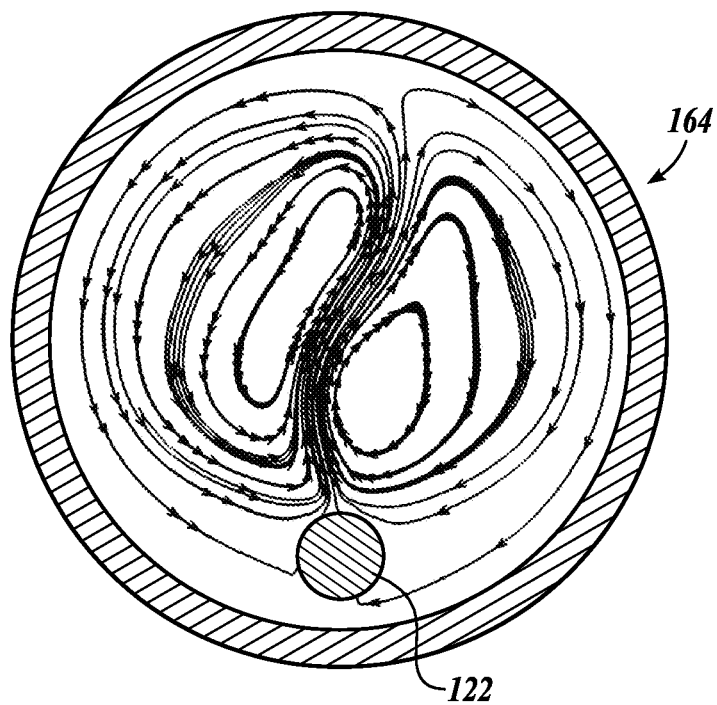
FIG. 7 shows results of an analysis of convective currents produced in a sealed container containing a TES media, showing the difference between convective flow for a single heating element centered in the lower quadrant of a sealed container and convective flow for two heating elements located as indicated in FIG. 6.
Figure 7B:
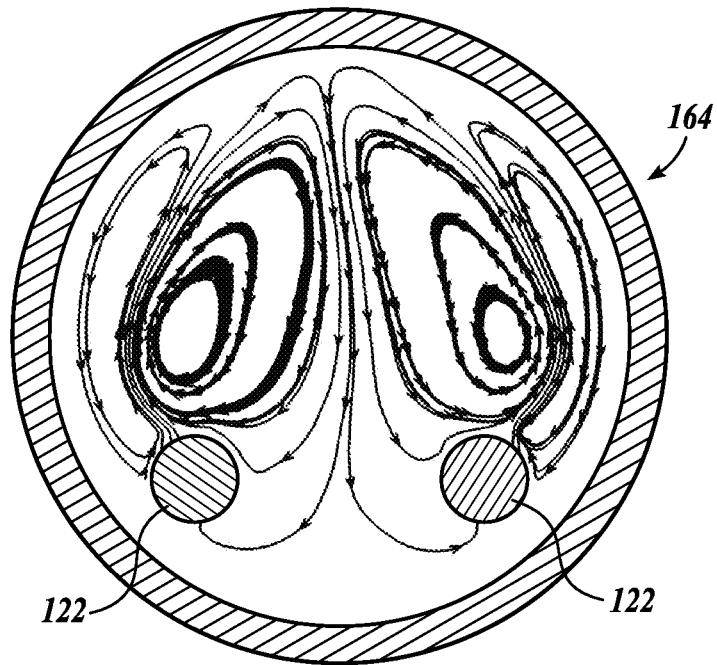

FIG. 6 illustrates a currently preferred placement of heating elements 122 within the sealed containers 164, which may be any of the sealed containers containing TES media disclosed herein. Refer also to FIGS. 7A and 7B. FIG. 7A illustrates a convective flow pattern found for TES media in a tubular container 164 when a single heating element 122 is located centrally in a lower half of the container 164. FIG. 7B illustrates a convective flow pattern found for a similar arrangement, but with two heating elements 122 located in opposite quadrants of the lower half of the container 164.

Placing a heating element 122 centered in the lower half of the container 164 advantageously produces a pair of vortices that is helpful for distributing the energy throughout the TES media 166 in the container 164, such that the energy can be readily transferred to the HTF as it flows around the container 164. However, it was surprising to find, as shown in FIG. 7B, that placement of two heating elements 122 in opposite quadrants in the lower half of the container 164 produces secondary vortices near the wall of the container 154B, which improves the heat transfer to the walls of the container 164, and will therefore improve heat transfer from the TES media 156B to the HTF. In this exemplary embodiment the heating elements are located at an angle forty-five degrees from vertical (a) (FIG. 6). In particular, the enhanced convective currents provide improved mixing within the containers 164, more evenly dissipating heat within the containers 164, and avoiding local hot spots within the containers 164, which can lead to premature failures. The improved convention, may also improves the reliability and operable life of the system.

Optionally, it is contemplated that an external heating element 123 may be provided around the periphery of the container 164. The external heating element 123 therefore is in the HTF flow channel outside of the sealed container 164. External heating elements 123, which are contemplated for any of the embodiments disclosed above, provide several advantages. In addition to providing an additional mode to store available excess electricity production in the TES component as thermal energy, external heating elements provide the operator with an additional mechanism for directly heating HTF passing through the TES component 150.

As briefly discussed above, modern power blocks are typically designed to operate most efficiently over a very narrow range of input conditions, and the efficiency of the power block may drop rapidly when the input flow does not fall into this range. It is important, therefore, that a TES component be able to reliably provide the energy to produce the requisite temperature and mass flow. TES systems however inherently deplete the stored thermal energy in the TES component as energy is transferred to the HTF. If the stored thermal energy drops below parameters required to produce the flows required by an associated power block, then it is important to be able to supplement the thermal energy from the TES component.

An external heating element 123 allows electric energy to directly heat HTF passing through the TES component 150. The external heating element 123 may be provided along the entire length of the containers, for example containers 154A, 154B in FIGS. 5A and 5B. In some embodiments the external heating elements are only provided on the upstream or radially outer containers 154A. During a discharge cycle the HTF entering the TES component 150 is relatively cool and heats up as it flows through the TES container 150. Therefore, the external heating elements 123 are able to more rapidly add energy to the HTF flowing around the radially outer (and cooler) containers 154A.

Of course, the outer heating elements 123 will also heat the TES media 156A, 156B, and may further be configured to heat the containers themselves.

In some embodiments heating elements are resistive heating elements. In other embodiments heating elements are inductive heating elements. For example, the sealed containers may be formed, at least in part, from a ferromagnetic material, and the induction heaters configured to cause the sealed containers to heat. In another example, the TES media and/or the HTF may include a ferromagnetic component that can be inductively heated. In other embodiments the heating elements may comprise dielectric heating elements, for example when the TES media or HTF comprise or include a dielectric material.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A thermal energy storage (TES) component comprising:
   a shell defining an enclosed volume, and having a first port into the volume and a second port into the volume;
   a first set of spaced-apart thermally conductive sealed containers disposed in a first section of the enclosed volume, the first set of sealed containers enclosing a first TES media;
   a second set of spaced-apart thermally conductive sealed containers disposed in a second section of the enclosed volume, the second set of sealed containers enclosing a second TES media;
   a cylindrical baffle disposed in the shell, wherein the first section of the enclosed volume comprises an annular portion of the enclosed volume radially outward from the cylindrical baffle and the second section of the enclosed volume comprises a cylindrical portion of the enclosed volume radially inward from the cylindrical baffle; and
   a flow path for a heat transfer fluid extending sequentially through the first port, then through the first section in spaces between the first set of sealed containers, then through the second section in spaces between the second set of sealed containers, and then through the second port.

2. The TES component of claim 1, wherein the second TES media is different from the first TES media.

3. The TES component of claim 1, wherein the first and second sets of thermally conductive sealed containers are cylindrical tubes.

4. The TES component of claim 3, wherein the first set of sealed containers are aligned with the second set of sealed containers.

5. The TES component of claim 1, further comprising a third set of spaced-apart thermally conductive sealed containers disposed in a third section of the enclosed volume between the first section and the second section, wherein the third set of sealed containers enclose a third TES media that is different from the first TES media.

6. The TES component of claim 1, further comprising a first plurality of electric heating elements immersed in the first TES media enclosed in the first set of sealed containers, and further wherein the plurality of heating elements are electrically connected to an external source of electricity.

7. The TES component of claim 6, further comprising a second plurality of electric heating elements immersed in the second TES media enclosed in the second set of sealed containers, wherein the second plurality of electric heating elements are electrically connected to an external source of electricity.

8. The TES component of claim 6, wherein the first set of sealed containers comprises sealed tubes that are oriented horizontally, and wherein the first plurality of electric heating elements are immersed in the first TES media in a lower half of the sealed tubes.

9. The TES component of claim 8, wherein at least two of the first plurality of electric heating elements are disposed in each of the first set of sealed containers, wherein the at least two heating elements are disposed in opposite lower quadrants of the associated sealed container.

10. The TES component of claim 1, further comprising a plurality of electric heating elements disposed on an outer surface of the first set of sealed containers, wherein the plurality of electric heating elements are connected to an external source of electricity.

11. The TES component of claim 10, wherein the plurality of electric heating elements are inductive heating elements.

12. The TES component of claim 1, wherein the first and second sets of sealed containers are frustoconical tubes.

13. The TES component of claim 12, further comprising a plurality of heating elements immersed in the first TES media, wherein each of the plurality of heating elements extend from a larger end of an associated frustoconical tube part way towards a smaller end of the associated frustoconical tube.

14. The TES component of claim 1, wherein the first port defines a flow path into the annular first section and the second port defines a flow path into the cylindrical second section.

15. A thermal energy storage (TES) component comprising:
a shell defining an enclosed volume, and having a first port into the volume and a second port into the volume;
a set of spaced-apart thermally conductive sealed tubes disposed in the enclosed volume, the set of spaced-apart thermally conductive sealed tubes each enclosing a TES media;
a plurality of electrical heating elements, each heating element associated with one sealed tube of the set of sealed tubes and immersed in the TES media enclosed in the associated sealed tube;
at least one baffle disposed in the shell between the first port and the second port;
a flow path for a heat transfer fluid extending through the first port into the enclosed volume in spaces between the sealed tubes, around the at least one baffle, and through the second port;
wherein the set of sealed tubes are tapered tubes having a large end and a small end, and wherein the heating element extends from the large end part way towards the small end; and
wherein the tapered sealed tubes are oriented in opposite directions within the shell, such that a large end of each sealed tube is near to a small end of at least one neighboring sealed tube.

16. The TES component of claim 15, wherein the sealed tubes are frustoconical and arranged in a parallel array.

17. The TES component of claim 15, further comprising a second plurality of electrical heating elements, each heating element associated with one of the sealed tubes and disposed on an external surface of the associated sealed tube.

* * * * *